Jan. 27, 1925.  
F. V. KESSELMAN  
1,524,179  
METHOD AND APPARATUS FOR MAKING PLATE GLASS  
Filed July 24, 1922  
3 Sheets-Sheet 1
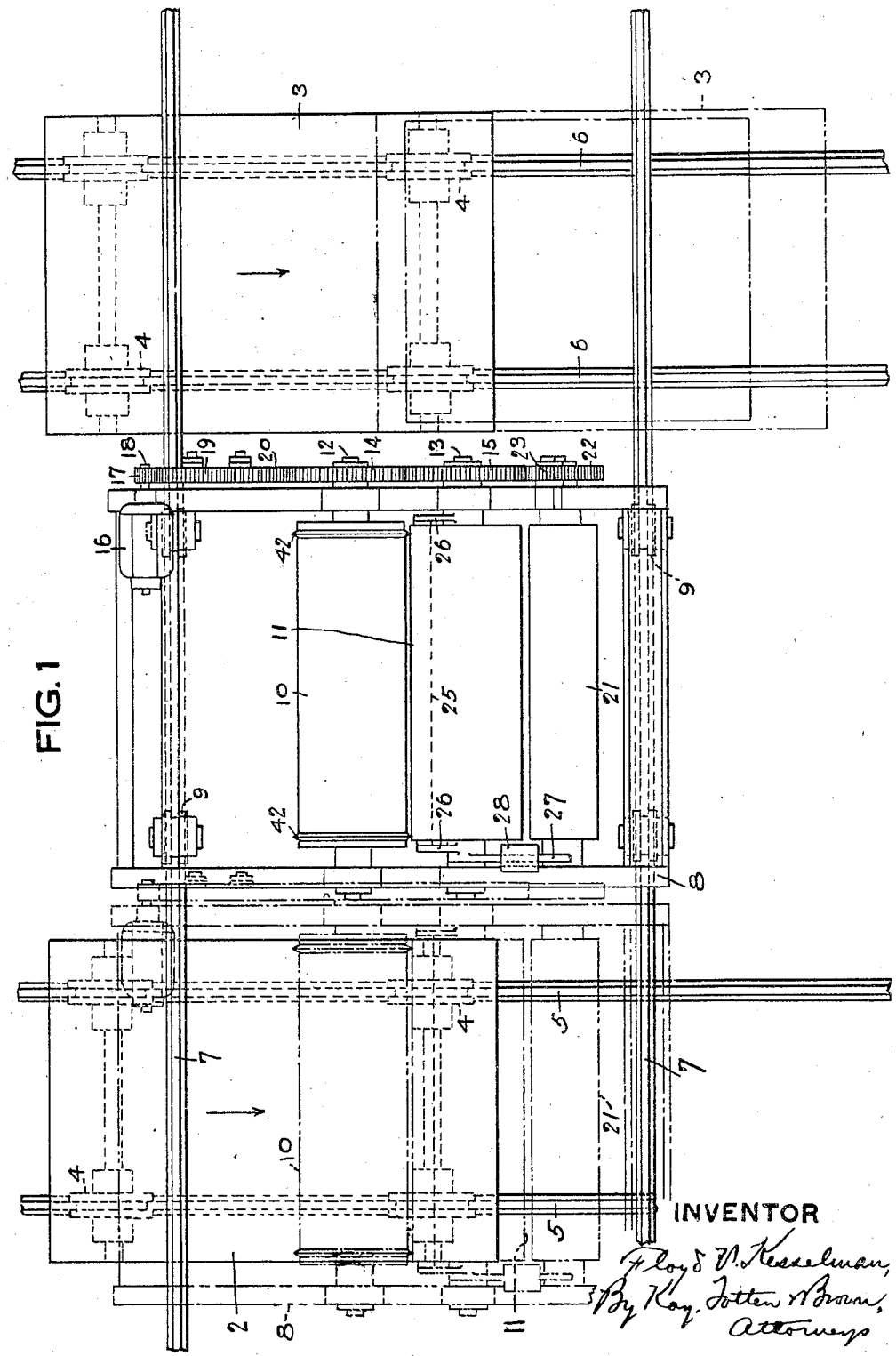
INVENTOR Jan. 27, 1925.
F. V. KESSELMAN
1,524,179
METHOD AND APPARATUS FOR MAKING PLATE GLASS
Filed July 24, 1922
3 Sheets-Sheet 2
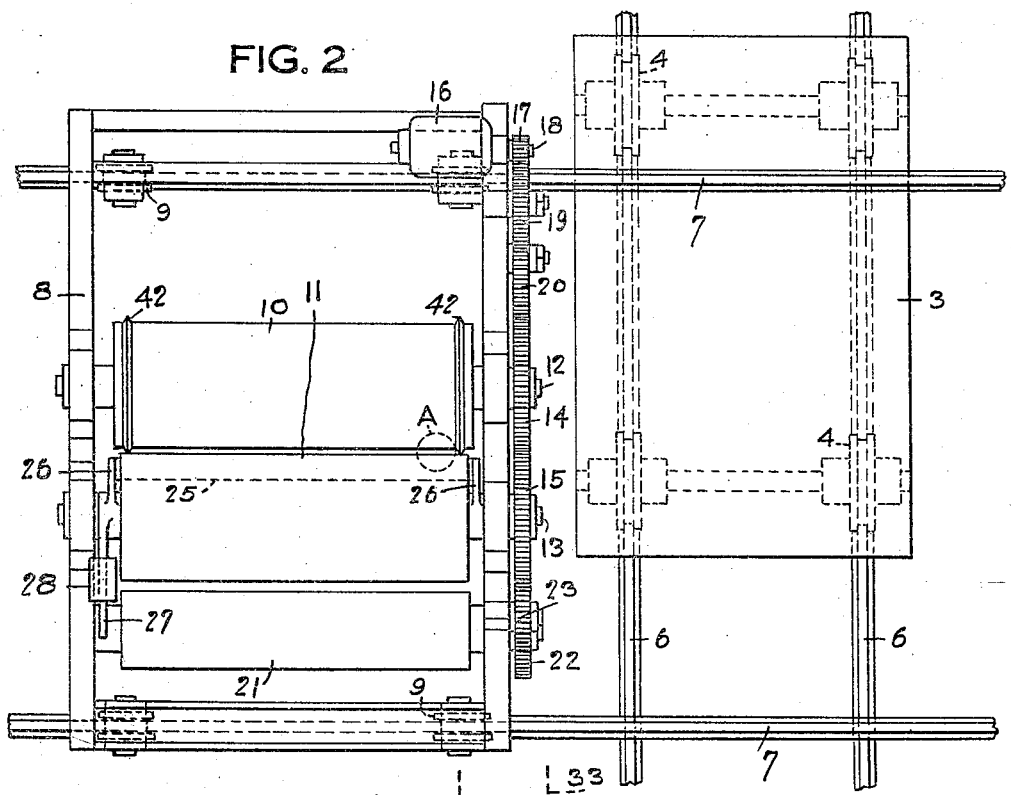
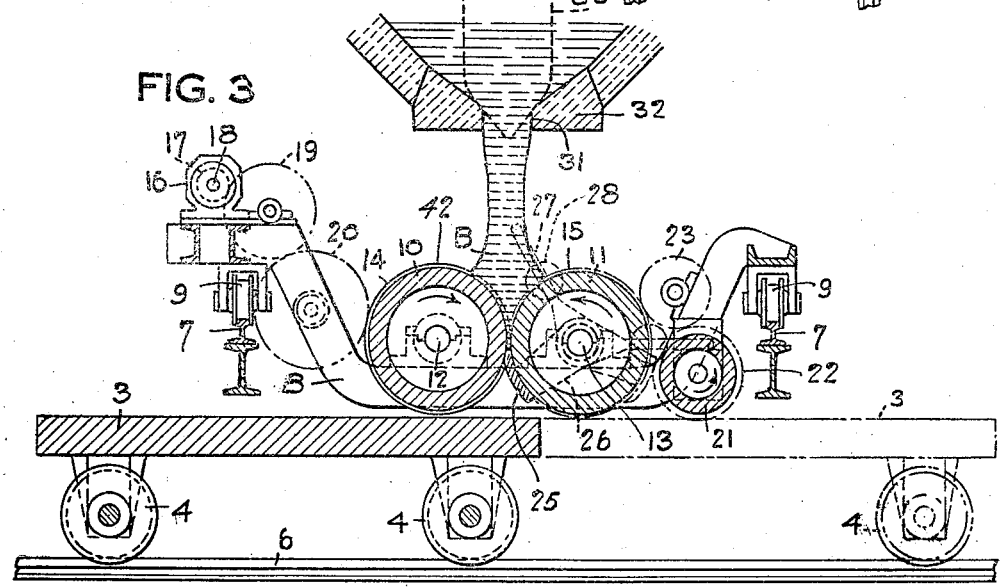
INVENTOR
Floyd V. Kesselman,
By Kay, Totten & Brown,
Attorneys Jan. 27, 1925.  
F. V. KESSELMAN  
METHOD AND APPARATUS FOR MAKING PLATE GLASS  
Filed July 24, 1922   3 Sheets-Sheet 3
1,524,179
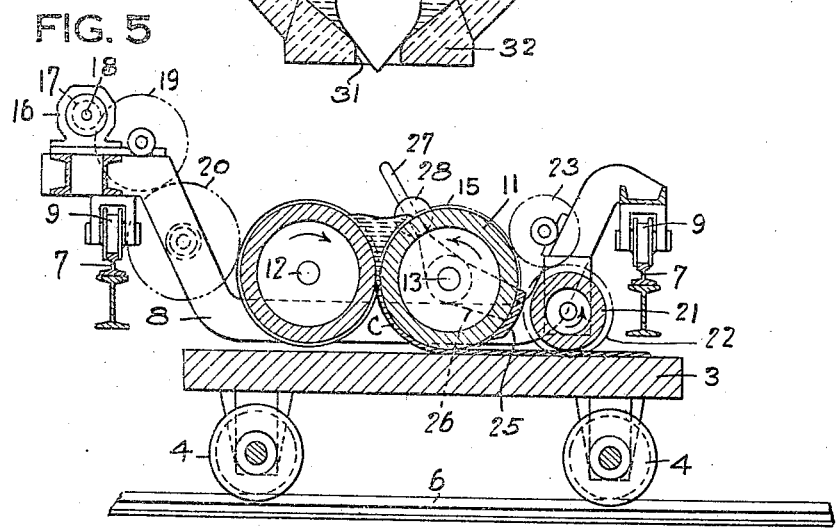
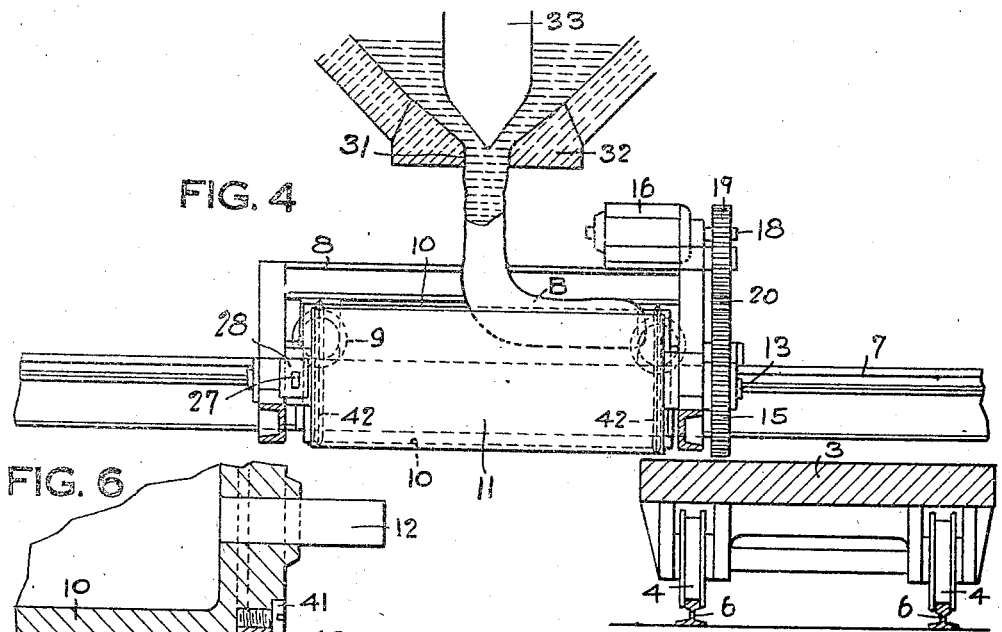
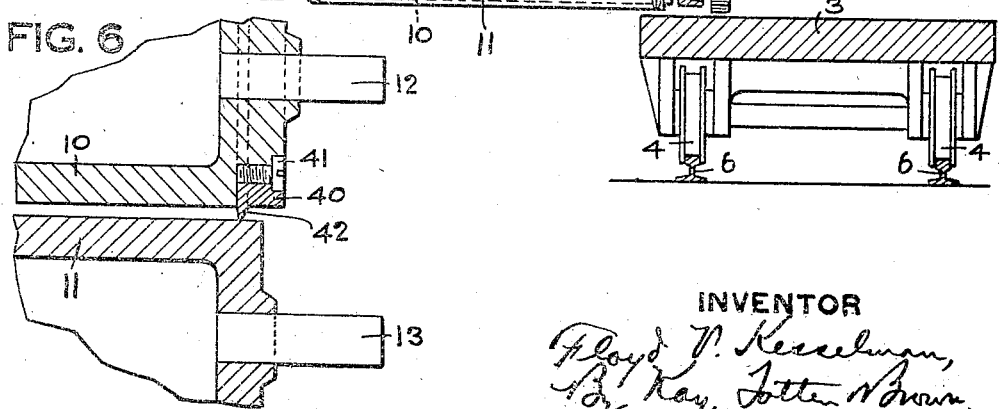
INVENTOR Patented Jan. 27, 1925.

1,524,179

UNITED STATES PATENT OFFICE.

FLOYD V. KESSELMAN, OF BUTLER, PENNSYLVANIA, ASSIGNOR TO FRANK E. TROUTMAN AND CHARLES H. CHRISTIE, BOTH OF BUTLER, PENNSYLVANIA.

METHOD AND APPARATUS FOR MAKING PLATE GLASS.

Application filed July 24, 1922. Serial No. 577,069.

*To all whom it may concern:*

Be it known that I, FLOYD V. KESSELMAN, a citizen of the United States, and resident of Butler, in the county of Butler and State of Pennsylvania, have invented a new and useful Improvement in Methods and Apparatus for Making Plate Glass; and I do hereby declare the following to be a full, clear, and exact description thereof.

My invention relates to the manufacture of plate glass by casting and rolling.

The object of my invention is to cast high-quality plate glass in plates such as are used for automobile wind-shields and windows.

In an application for Letters Patent, Serial No. 577,068, filed July 24th, 1922, I have described a method and apparatus for accomplishing the same object of casting first-quality glass in small plates, wherein gobs or gathers of glass are deposited successively upon a series of casting tables arranged upon a rotary platform which brings the tables in succession beneath the glass feeder. According to my present invention, I make use of two casting tables only, and I mount these tables upon parallel tracks across and above which is arranged a third track supporting a carriage which is moved above the two parallel tracks alternately. The carriage carries a pair of rolls which, when the carriage passes from one position to the other, move lengthwise beneath a glass feeder which deposits a mass of glass between the rolls. I provide a stopper for preventing the glass from flowing between the rolls until the carriage is brought above the table on one of the two parallel tracks, whereupon the stopper is removed and the rolls are operated to form the glass into a plate which falls upon the casting table. At this time, the table is moved at a speed corresponding to the speed of the forming rolls, so as to properly receive the discharged plate of glass. While a plate is thus being formed upon one of the casting tables another casting table is brought up on the other track, and after the forming rolls discharge the plate of glass the stopper is replaced and the roll carriage is moved across to a position above the other track, receiving a charge of glass as it passes beneath the glass feeder. Plates of glass are thus formed alternately on opposite sides of the glass feeder, and the operation is continuous as long as glass is properly supplied.

The glass feeder which deposits the glass between the rolls may be of the gob-feeding type which is employed in the manufacture of bottles and other hollow glassware, or it may be of the type suitable for plate glass casting. The latter form of feeder is selected for illustration in the accompanying drawing.

In the drawing, Fig. 1 is a plan view showing the essential parts of a casting system constructed in accordance with my invention; Fig. 2 is a plan view of the roll carriage and one of the casting tables at the beginning of a casting operation; Fig. 3 is a vertical sectional view taken through the roll carriage and through the outlet of a glass feeder, showing the discharge of glass between the rolls; Fig. 4 is a side elevational view with parts in section, showing the roll carriage receiving a charge of glass from the glass feeder; Fig. 5 is an end elevational view of the roll carriage showing a plate of glass being deposited upon one of the casting tables; and Fig. 6 is a fragmentary horizontal sectional view through one end of the set of glass-forming rolls, showing the circular knife for cutting the edges of the glass sheets.

In the drawing the numerals 2 and 3 indicate casting tables which are provided with wheels 4 running upon parallel tracks 5 and 6, respectively. Across and above the tracks 5 and 6 is another set of tracks 7 upon which is mounted a carriage 8 having wheels 9 which run upon the tracks 7, and also having a motor and gearing for moving the carriage on the tracks 7. Since these power connections are such as are ordinarily provided on glass casting carriages they are omitted from the drawing for the sake of clearness. Two glass-forming rolls 10 and 11, carried by horizontal shafts 12 and 13, respectively, are mounted in suitable bearings on the carriage 8 and are connected to rotate together by means of meshing gears 14 and 15 secured to the shafts 12 and 13. The gear 14 is driven from an electric motor 16 through a pinion 17 secured to the armature shaft 18 of the motor 16 and through change-speed gears 19 and 20. A smoothing roll 21, smaller than the rolls 10 and 11, is mounted near the roll 11 and is driven at the same peripheral speed as the rolls 10 and 11, or at slightly greater speed, through a gear 22 meshing with a gear 23 in mesh with the gear 15.

The surfaces of the rolls 10 and 11 are separated by a space equal to the thickness of the desired plate that is to be formed. In order to prevent the glass from flowing between the rolls when it is deposited thereon by the feeder, a stopper 25 is arranged to be inserted from beneath into the space between the rolls, and to be thereafter removed to permit the glass to pass between the rolls. For this purpose the stopper 25 is suspended from two arms 26 which, as shown, are mounted loosely on the shaft 13 of the roll 11. One of the arms 26 is provided with a handle 27 to which a weight 28 may be attached for forcing the stopper 25 between the rolls when the handle 27 is in its lower position, as shown on Fig. 3. This weight also holds the stopper 25 withdrawn and the handle 27 in its upper position while the glass is being rolled. Various other means may of course be employed for operating the stopper 25.

Above the carriage 8, and between the parallel tracks 5 and 6, is a glass feeder which, as stated above, may be of any suitable type which is capable of discharging the glass in discontinuous streams or gobs. A gob feeder such as I have shown in my copending application, Serial No. 577,068 may be employed equally well. As shown on the drawing, the feeder comprises a glass receptacle having a downwardly opening discharge outlet 31 formed in a bushing 32, and a plunger 33 adapted to reciprocate vertically above the outlet 31 to open and close the outlet. This type of feeder may also be provided with some means for disposing of the chilled glass which forms in the intervals between the glass-discharging operations, and for permitting the glass to issue with a clean and hot leading end. Such devices are not shown on the present drawing, since these details form no part of my present invention.

Another feature of my invention is the provision of knives upon the plate-forming rolls for trimming the edges of the plate as it is formed, and thus giving the plate a clean edge instead of the rough edges which are left by the ordinary casting rolls, and saving the expense of trimming the plate after it is cast. These knives, as shown in the drawing, consist of rings 40 secured to the ends of the roll 10 by means of screws 41, or otherwise, and provided with circular knife edges 42. The rings 40 are preferably composed of hardened steel and may be removed for sharpening or for replacement when worn out.

Fig. 2 shows the relative position of the carriage 8 and the table 3 at the beginning of the operation of forming a plate of glass upon the table 3. A stream or gather of glass, the section of which is indicated in dotted lines at A, is being discharged from the glass feeder. As the leading end of the gather A reaches the rolls 10 and 11, the carriage 8 is moved to the right, Figs. 1, 2 and 4, thus receiving the glass in a uniform mass B, Figs. 3 and 4. The stopper 25 at this time is in the position shown in Fig. 3, and the glass therefore remains between the rolls until the carriage is advanced on the track 7 to a position above the table 3. The stopper 25 is then withdrawn and the motor 16 is started to rotate the rollers 10 and 11 in the direction of the arrows on Figs. 3 and 5. This forces the glass down between the rolls in the form of a sheet or plate C. The table 3, which is provided with the usual motor and gearing for advancing it on the tracks 6, is started in motion as the leading end of the plate C reaches the surface of the table, and the plate thereafter follows the periphery of the roll 11, as shown in Fig. 5, the roll 11 thus acting somewhat in the same manner as the usual casting-table roll. The smoothing roll 21 engages the surface of the plate C and smooths out any irregularities that may be left by the forming rolls. After receiving the plate C the table 3 continues on the track 6 to a suitable point, where the sheet C is removed, after which the table 3 is returned to its original position, as shown on Fig. 1 of the drawing.

Meanwhile, the stopper 25 has been returned to the position shown in Fig. 3 and the carriage 8 has been moved across on the track 7 to a position above the table 2 on track 5. During this movement another mass of glass is deposited between the rolls 10 and 11 in the manner described above, and this glass is then formed into a plate upon the table 2 in the same manner as the plate C was formed on the table 3. This operation is continued at suitable intervals, the flow of glass being of course interrupted by the plunger 33 or by other means after each gather of glass is deposited between the plate-forming rolls. As each plate is formed, its edges are trimmed by the knives 42.

I am aware that sheets of glass have heretofore been formed by extruding the glass between two horizontal rolls, but in all such prior methods it has been thought necessary to bring the glass to the rolls in a body as wide as the rolls, special discharge spouts or ladles being employed for this purpose. I believe that I am the first to lay an elongated mass of glass progressively between two sheet-forming rolls for the production of plate glass, and to employ a reciprocating carriage for this purpose.

Various changes may be made in the construction and arrangement of the parts described above, and I therefore wish it to be understood that my invention is not restricted to these details of construction, but is limited only by the scope of the appended claims. It will also be understood that the term "plate glass" as used herein, is not restricted to glass that is ground and polished, but includes flat glass of any kind, whether polished or not.

I claim as my invention:

1. The method of making plate glass that comprises depositing a stream of molten glass of substantially uniform cross sectional area upon a pair of cooperating rolls while said rolls are stationary, imparting relative movement as between said rolls and glass in a direction transversely of the flow of glass, and rotating said rolls to extrude the glass between them in sheet form.

2. The method of making plate glass that comprises receiving a descending mass of glass between a pair of cooperating rolls, producing relative movement between said mass of glass and said rolls to distribute said glass lengthwise between said rolls, and then rotating said rolls to extrude the said glass between them in sheet form.

3. The method of making plate glass that comprises receiving a descending mass of glass between a longitudinally moving pair of cooperating rolls and then rotating said rolls to extrude the said glass between them in sheet form.

4. The method of making plate glass that comprises receving a descending stream or column of glass between a longitudinally moving pair of cooperating rolls, and then rotating said rolls to extrude the glass between them in sheet form.

5. The method of making plate glass that comprises distributing molten glass lengthwise between a pair of cooperating rolls, preventing the glass from flowing between said rolls while being so distributed, and then rotating said rolls and permitting the glass to be extruded between said rolls in sheet form.

6. The method of making plate glass that comprises receiving a descending mass of glass between a pair of cooperating rolls, producing relative movement between said rolls and said glass to distribute said glass lengthwise between said rolls, preventing the glass from flowing between said rolls while being so distributed, and then rotating said rolls and permitting the glass to be extruded between said rolls in sheet form.

7. The method of making plate glass that comprises receiving a descending mass of glass between a longitudinally moving pair of cooperating rolls, preventing the glass from flowing between said rolls while being so distributed, and then rotating said rolls and permitting the glass to be extruded between said rolls in sheet form.

8. The method of making plate glass that comprises receiving a descending stream or column of glass between a longitudinally moving pair of cooperating rolls, interrupting the flow of said stream, and rotating said rolls to extrude the said glass between them in sheet form.

9. The method of making plate glass that comprises receiving a descending stream of glass between a longitudinally moving pair of cooperating rolls, preventing the glass from flowing between said rolls while being so distributed, interrupting the flow of said stream and then rotating said rolls and permitting the glass to be extruded between said rolls in sheet form.

10. Apparatus for making plate glass that comprises glass-feeding means for producing a descending mass of molten glass, a pair of cooperating rolls disposed beneath said glass-feeding means, means for producing relative movement between said glass and said rolls, thereby distributing said glass lengthwise between said rolls, and means for rotating said rolls and for thereby extruding said glass between them in sheet form.

11. Apparatus for making plate glass comprising a pair of cooperating rolls having their adjacent edges spaced apart, means for depositing glass lengthwise between said rolls, a stopper for preventing said glass from flowing between said rolls while being so distributed, and means for rotating said rolls and for thereby extruding said glass between said rolls in sheet form.

12. Apparatus for casting plate glass comprising glass-feeding means for producing a descending mass of molten glass, a pair of cooperating rolls adapted to receive said glass between them, means for producing relative movement between said glass and said rolls, thereby distributing said glass lengthwise between said rolls, a stopper adapted to be removably inserted beneath and between said rolls for preventing the glass from flowing between said rolls while being so distributed, and means for rotating said rolls and for thereby extruding said glass between them in sheet form.

13. Apparatus for making plate glass that comprises glass-feeding means for producing a descending mass of molten glass, a longitudinally movable pair of cooperating rolls having their adjacent surfaces spaced apart, said rolls being movable beneath said descending glass, whereby said glass is deposited lengthwise between said rolls, a stopper adapted to be removably inserted beneath and between said rolls to prevent the glass from flowing between said rolls while being so distributed, and means for rotating said rolls and for thereby extruding said glass between them in sheet form.

14. Apparatus for making plate glass comprising a glass feeder, a carriage movable beneath said feeder, a pair of cooperating rolls mounted on said carriage in position to receive glass from said feeder between them, means for preventing glass from flowing between said rolls while the glass is being deposited therebetween, and means for rotating said rolls to extrude glass between them in sheet form.

15. Apparatus for making plate glass comprising a glass feeder, a carriage movable beneath said feeder, a pair of cooperating rolls mounted on said carriage in position to receive glass from said feeder between them, means for preventing glass from flowing between said rolls while the glass is being deposited therebetween, means for rotating said rolls to extrude glass between them in sheet form, and tables disposed on opposite sides of said feeder and adapted to receive the sheets of glass from said rolls.

16. Apparatus for making plate glass comprising a glass feeder, parallel tracks disposed below and on opposite sides of said feeder, casting tables carried by said tracks, a third track extending across and above said first-named tracks and below said feeder, a carriage mounted on said last-named track for reciprocation below said feeder, and a pair of cooperating rolls mounted in said carriage and adapted to receive glass from said feeder between them.

17. Apparatus for making plate glass comprising a glass feeder, parallel tracks disposed below and on opposite sides of said feeder, casting tables carried by said tracks, a third track extending across and above said first-named tracks and below said feeder, a carriage mounted on said last-named track for reciprocation below said feeder, a pair of cooperating rolls mounted in said carriage, and adapted to receive glass from said feeder between them, and means for preventing glass from flowing between said rolls until said carriage is brought above one of said casting tables.

18. Apparatus for making plate glass comprising a tank furnace, a glass feeder for delivering glass from said furnace, parallel tracks disposed below and on opposite sides of said feeder, casting tables running on said tracks, a third track extending across and above said first-named tracks and below said feeder, a carriage mounted on said last-named track for reciprocation beneath said feeder, a pair of cooperating horizontal rolls mounted on said carriage with their adjacent surfaces spaced apart, said rolls being adapted to receive glass from said feeder between them, and a stopper adapted to be removably inserted below and between said rolls to prevent glass from flowing between said rolls.

19. Apparatus for making plate glass comprising a pair of cooperating rolls having their adjacent surfaces spaced apart, a stopper for the glass adapted to be inserted between and beneath said rolls to prevent the flow of glass between said rolls, and means for moving said stopper out of the path of movement of the glass.

20. Apparatus for making plate glass comprising a pair of cooperating rolls having their adjacent surfaces spaced apart, rings secured removably to the ends of one of said rolls and circular trimming knives carried by said rings.

In testimony whereof I, the said FLOYD V. KESSELMAN, have hereunto set my hand.

FLOYD V. KESSELMAN.